FIG. 1

INVENTOR.
John W. Smith
BY
Attorney

Patented July 13, 1954

2,683,401

UNITED STATES PATENT OFFICE 2,683,401

METHOD AND APPARATUS FOR APPLYING RIP STRIPS TO WRAPPING SHEETS

John W. Smith, Battle Creek, Mich., assignor to Battle Creek Bread Wrapping Machine Company, Battle Creek, Mich.

Application August 17, 1951, Serial No. 242,365

25 Claims. (Cl. 93—1)

This invention relates to improvements in method and apparatus for applying rip strips to wrapping sheets.

The principal objects of this invention are:

First, to provide a novel means and apparatus for applying narrow strips of sheet material to the surface of sheets of wrapping material so that the ends of the strips will project from the package about which the sheet is wrapped to facilitate opening of the wrapper and package.

Second, to provide a rip strip applying machine that forms successive rip strips economically by severing narrow widths from the end of a web of sheet material.

Third, to provide means for severing a rip strip from the end of a web of material and for applying the strip to a continually advanced web of wrapping material.

Fourth, to provide a machine that will sever rip strips and apply the same to a web of wrapping material at preselected intervals along the web and thereafter nick one edge of the wrapper web on each side of each rip strip.

Fifth, to provide a rip strip applying machine which will operate rapidly and which requires a minimum amount of structure and mechanism.

Sixth, to provide a machine which will sever a rip strip from a supply web and heat seal the strip transversely across a web of wrapping material in a single motion.

Other objects and advantages of my invention will be apparent from a consideration of the following description and claims.

The drawings, of which there are five sheets, illustrate a highly practical form of my machine.

A great many of articles and materials produced and sold today are wrapped in individual wrappers and it is common practice in packaging some articles and materials to include a narrow strip of material along the inner surface of the wrapper sheet with one end of the strip projected from the outer or last fold of the wrapper so that the strip can be pulled backwardly along the wrapper to sever or tear the wrapper sheet for easy access to the contents of the package. Such strips are referred to as rip strips and have uniformly been applied to the wrapper sheet heretofore by extending a length of the rip strip material from a supply coil across the wrapper sheet and sealing the strip to the sheet at some point in the path of travel of the sheet to the wrapping machine.

I now propose to supply and form rip strips by cutting narrow strips from the end of a wide supply roll of strip forming material. Such rip strip is then secured to the sheet or web of wrapping material prior to folding the wrapper around a package. By forming each rip strip from a transversely extending strip along the end of a web of material I eliminate the necessity of forming narrow coils of rip strip material and further eliminate the frequent shut down of a strip applying machine because a roll of strip forming material will provide stock for a great many more rip strips than would a coil of strip material of the same diameter. The application of the rip strip simultaneously across the entire width of a wrapper sheet or web eliminates the necessity of mechanism for feeding the rip strip transversely of the path of travel of the wrapper web and permits the wrapping machine to operate at a more rapid rate.

In Figs. 1, 2, 5, 6 and 7 I have illustrated portions of a wrapping machine 1 having a frame 2 and provided with feed rolls 3 for continuously delivering a web of wrapping material to be formed into individual wrapper sheets and wrapped around a package or other article. The wrapping machine includes near its inlet end a fixed knife blade 4 cooperative with a rotating knife blade 5 for severing the wrapper web into individual sheets.

Figure 1:
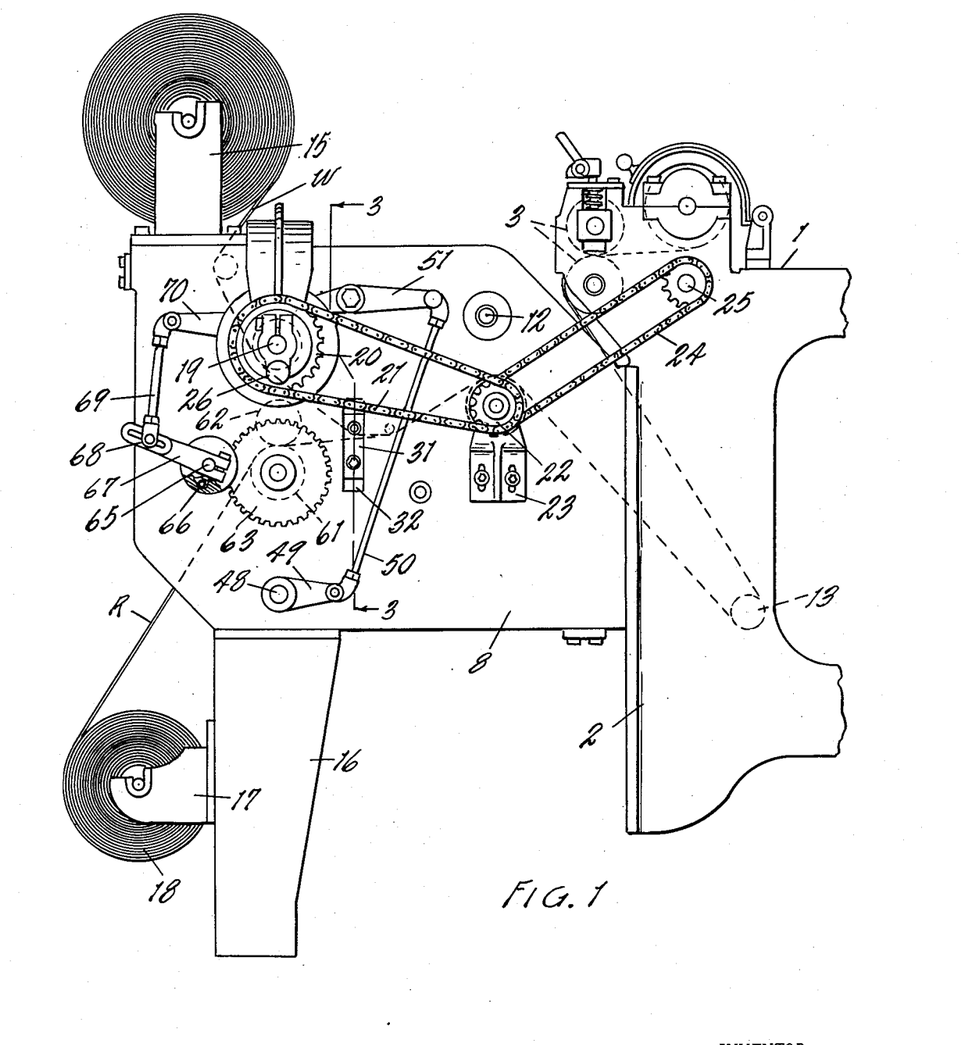
Fig. 1 is a side elevational view of the rip strip applying mechanism as attached to the infeed end of a wrapping machine.
Figure 2:
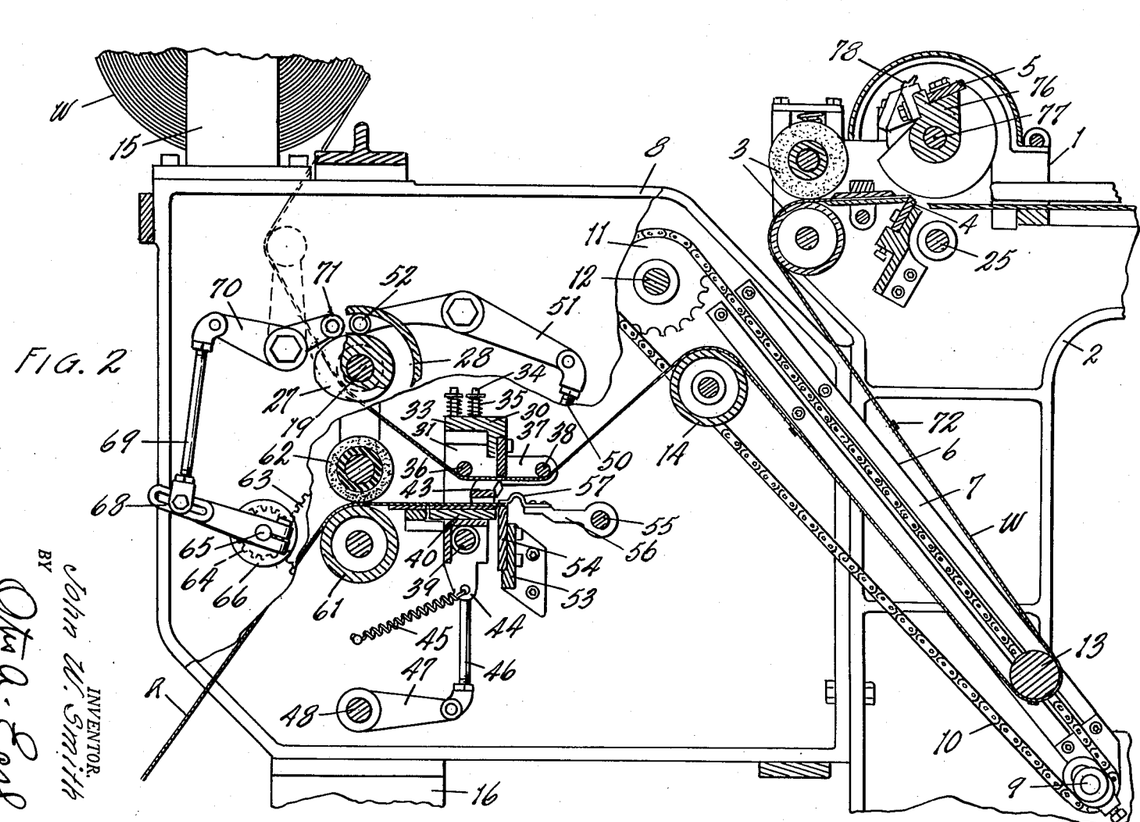
Fig. 2 is an enlarged fragmentary side elevational view of the structure shown in Fig. 1 partially broken away in vertical longitudinal cross section.

Operatively associated with the feed rolls 3 is a web feeding and slack control structure generally indicated at 6. The slack control structure includes a pair of downwardly and forwardly inclined support rails 7, one of which is illustrated in Fig. 2. The upper ends of the rails 7 are secured to the frame elements 8 which are secured to the front end of the wrapping machine frame 2 on opposite sides thereof. The lower ends of the support rail 7 carry stub shafts 9 around which chain loops 10 are trained. The upper ends of the loops 10 are trained around driving sprockets 11 mounted on a transversely extending shaft 12. The shaft 12 is arranged to be oscillated by mechanism which is not shown herein so that a takeup roll 13 supported between the two chain loops 10 is caused to move bodily upwardly and downwardly along the support rail 7. The web of wrapper material indicated at W is trained around the takeup roll 13 and an idler roll 14 between the feed rolls 3 and the rip strip applying mechanism. The structure thus described constitutes part of the mechanism of a wrapping machine now on the market and the details thereof form no part of the present invention except as they may specifically coact with the structure to be described. It should be understood that the feed rolls 3, wrapper sheet knife 5 and oscillating shaft 12 are all driven in timed relationship preferably from a common source.

The rip strip forming and applying structure is mounted on and extends between the before mentioned frame elements 8. On the top side of the frame elements are supports 15 for receiving a roll of the wrapper web material W. Supporting legs 16 at the bottom of the frame elements are provided with other supports 17 for receiving a roll of rip strip material 18. The roll 18 is desirably somewhat longer than roll of wrapping material so that the web of rip strip material indicated at R is slightly wider than the wrapper web W.

Extending transversely through the frame elements 8 and substantially beyond the outer sides thereof is a shaft 19. The front or left end of the shaft 19 as viewed in Fig. 3 has a sprocket 20 angularly adjustably connected thereto and a chain 21 extends from the sprocket to an idler sprocket 22 carried on a bracket 23 on the front frame element 8. The sprocket 22 is driven by a chain 24 from a cross shaft 25 in the wrapping machine so that the strip applying apparatus operates in timed relationship to the wrapping machine and the slack takeup roll 13. The adjustable connection between the sprocket 20 and the shaft 19 manipulated by the hand nut 26 permits the elements of the strip applying mechanism to be advanced or retracted relative to the web as it passes therethrough and relative to the leading edge of the web where it is cut off by the knife 5.

Figure 3:
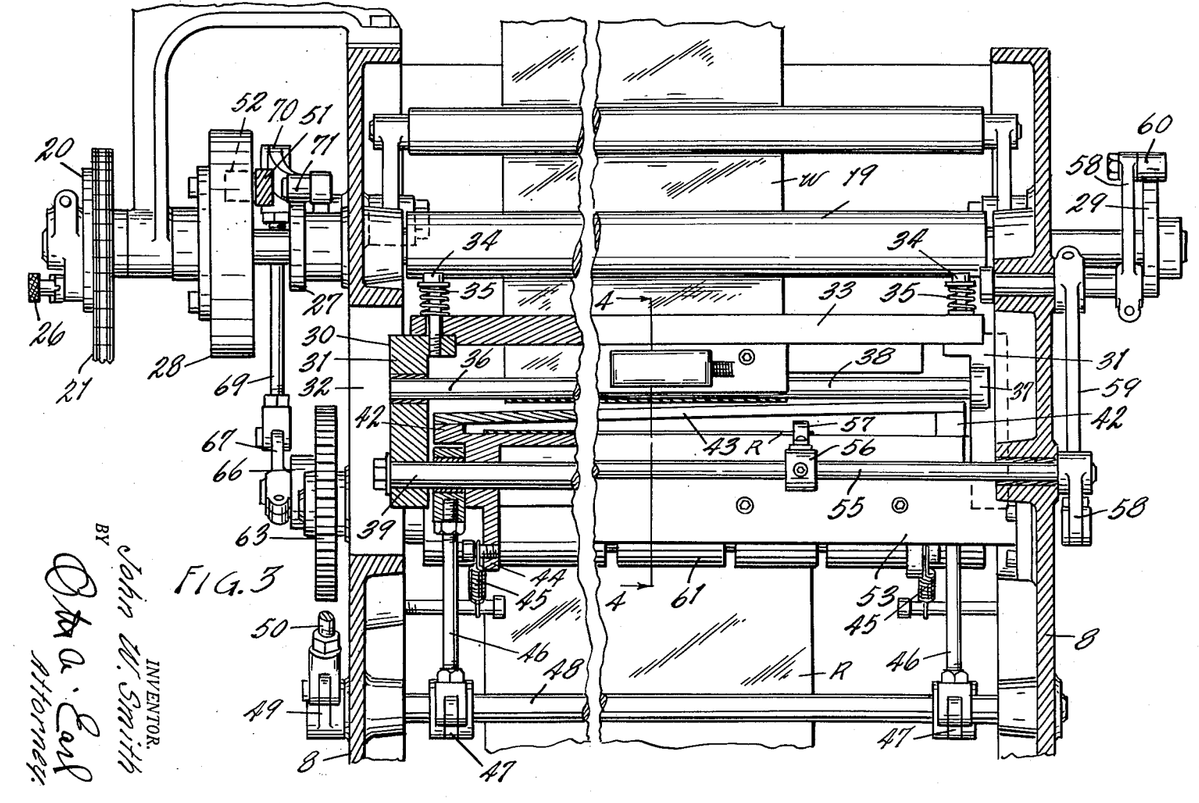
Fig. 3 is a fragmentary transverse cross sectional view through the machine taken along the plane of line 3—3 in Fig. 1.

With particular attention to Figs. 2 and 3 it will be noted that the left end of the shaft 19 carries an external cam 27 and an internal cam 28. The right end of the shaft 19 carries a second external cam 29. The first external cam 27 functions to advance a narrow or short length of the rip strip web R with each cycle of the machine while the internal cam 28 functions to actuate the strip severing and applying mechanism. The external cam 29 is connected to structure for holding severed rip strip while the strip is being applied to the web W of wrapping material as will be described in greater detail presently.

The rip strip severing and applying structure includes a carriage 30 which reciprocates vertically between the frame elements 8. The carriage 30 includes end blocks 31 that are slidably guided in vertical slots 32 formed in the frame elements 8 downwardly and rearwardly from the shaft 19. The upper ends of the end blocks 31 are connected by a cross bar 33 which is vertically yieldably clamped to the end blocks by the screws 34 and springs 35. Just below the cross bar 33 is a first guide roll 36 rotatably journaled in the end blocks and extending transversely therebetween. Arms 37 projecting rearwardly from the end blocks support a second idler roll 38 at approximately the same level as the roll 36. The web W is trained downwardly from its supply roll around the shaft 19 as a guide and rearwardly beneath the rolls 36 and 38 to the idler roll 14.

Spaced substantially below the idler roll 36 and connected between the end blocks 31 is a transversely extending cross shaft or bolt 39 of circular cross section. The bolt 39 pivotally supports a feed table 40, the table having depending ears 41 journaled on the bolt. The table 40 extends transversely substantially the full width between the end blocks 31 and is provided at each side with upstanding abutments 42 on which a moveable knife or shear bar 43 is mounted. One of the abutments 42 is desirably higher than the other so that the knife 43 is vertically and transversely inclined with respect to the webs R and W.

The ears 41 that support the table on the bolt 39 extend downwardly below the bolt as at 44 and are urged forwardly by springs 45 so that the knife 43 is constantly biased rearwardly.

Swingably journaled about the bolt 39 between the slide blocks 31 and the ears 41 are a pair of connecting rods 46 which hang downwardly and are connected at their lower ends to crank arms 47 secured to a rock shaft 48. The front or left end of the rock shaft 48 carries a driving crank 49 connected by the link 50 to the rear end of the cam lever 51. The forward end of the cam lever 51 has a follower 52 engaged with the internal cam 28. It will thus be seen that each cycle of the machine and rotation of the shaft 19 cause the carriage 30 including the table 40 and knife 43 to reciprocate vertically. The idler rolls 36 and 38 which are carried by the carriage also reciprocate vertically.

Rearwardly of the carriage 30 the frame elements 8 are provided with a rigid cross bar 53 which supports a transversely extending fixed knife or shear bar 54. The upper edge of the bar 54 is flat to support each successive rip strip as will be explained and the upper front edge of the shear bar coacts with the spring biased moveable shear bar 43 to sever the individual rip strips from the web R of rip strip material. A cross shaft 55 positioned rearwardly from the fixed shear bar 54 is provided with forwardly extending arms 56 having spring gripper fingers 57 on their forward ends. The arms 56 are adjustable longitudinally along the shaft 55 to be spaced slightly further apart than the width of the web W of wrapping material. The rear or right end of the shaft 55 is connected by a series of cranks 58 and links 59 to a follower 60 riding on the second external cam 29 on the shaft 19. The cam 29 is angularly timed with respect to the internal cam 29 so that the spring gripping fingers 57 are moved into engagement with the leading edge of the rip strip web R before or at about the same time that the movable shear bar 43 starts downwardly to sever a rip strip from the supply web. The fingers 57 serve to hold the newly severed rip strip in position on the flat upper edge of the fixed shear bar 54 during and after its severance from the web and until the rip strip is securely fastened to the wrapper web W.

The web R of the rip strip material is advanced across the table 40 by a pair of feed rolls 61 and 62 from the supply roll 18. The lower feed roll 61 is provided on its left end with a gear 63. The gear 63 meshes with a pinion 64 mounted on a stop shaft 65. A one way clutch element 66 also mounted on the shaft 65 is arranged to advance the pinion 64 and gear 63 in a web feeding direction but not to retract the gear 63 and feed rolls 61 and 62. A crank arm 67 secured to the driving portion of the clutch 66 is provided with a radially adjustable connection 68 to a connecting rod 69. The rod 69 is pivotally connected to a crank 70 having a follower 71 engageable with the first external cam 27 on the shaft 19. Thus each cycle of the shaft 19 oscillates the pinion 64 to advance a very short and adjustable lentgh of the web R of wrapping material to the fixed shear bar 54.

Figure 4:
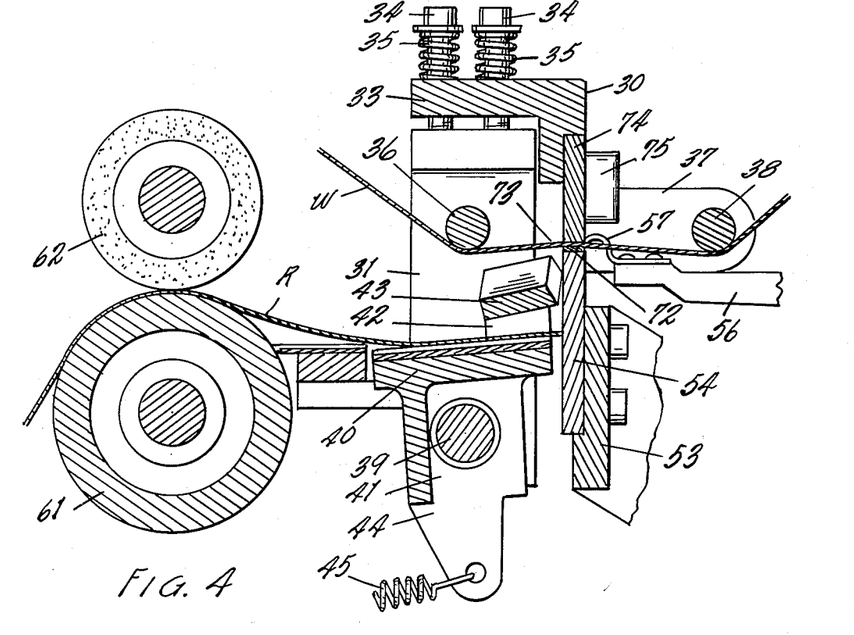
Fig. 4 is an enlarged vertical longitudinal cross sectional view through the actual rip strip severing and applying elements of my machine taken along the plane of the line 4—4 in Fig. 3.
Figures 5, 6, 7, 8:
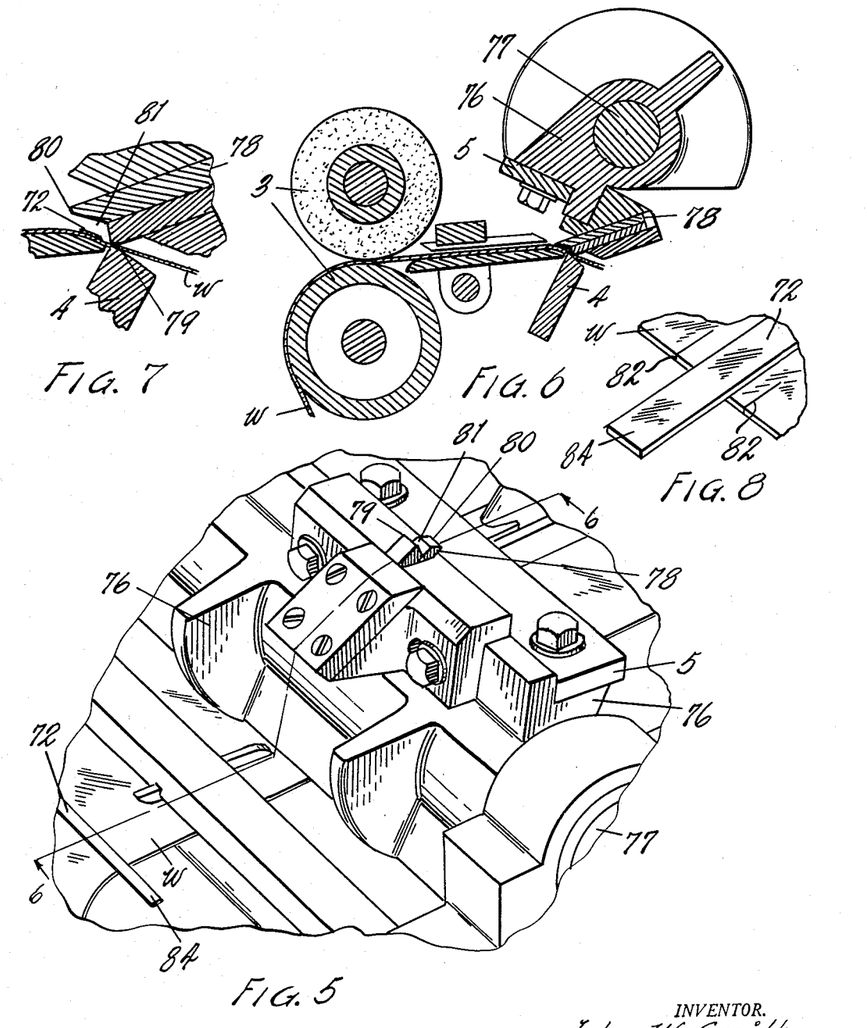
Fig. 5 is an enlarged fragmentary perspective view of the wrapper sheet severing and nicking cutter which cooperates with the rip strip applying apparatus.
Fig. 6 is a fragmentary transverse cross sectional view through the web cutting and nicking mechanism taken along the plane of the line 6—6 in Fig. 5.
Fig. 7 is a further enlarged fragmentary cross sectional view through web nicking knives shown in Figs. 5 and 6.
Fig. 8 is a fragmentary perspective view of the nicked web with a rip strip applied thereto as they emerge from the sheet cutting mechanism.

Comparing the position of the elements in Figs. 2 and 4 it will be noted that the carriage 30 and table 40 are elevated when the web R of rip strip material is advanced and gripped on the fixed shear bar 54 as in Fig. 2. Lowering motion of the carriage and movable shear bar 43 severs a new rip strip 72 from the web R and holds it on the fixed shear bar as shown in Fig. 4. Descending motion of the carriage also lowers the guide rolls 36 and 38 until their lower edges are below the level of the fixed shear bar 54. This movement causes the reach of the wrapper web W between the guide rolls to be bowed upwardly slightly as at 73 in Fig. 4 and causes the wrapper web to be pressed tightly across the top of the rip strip 72. In order to permanently seal the wrapper web W to the new rip strip the rear edge of the yieldable cross bar 33 carries a pressure bar 74 that coacts with the fixed shear bar 54. The pressure bar 74 has an electric heater 75 arranged to heat the pressure bar so that the wrapper web W and newly formed rip strip 72 are securely joined together. In order to form an effective bond between the wrapper web and the rip strip one or both of the materials is formed of a thermoplastic material or provided with a coating that is made soft or adhesive by the application of heat and pressure. Particular attention is directed to the fact that the lower edge of the pressure bar 74 is spaced above the lower edges of the guide rolls 36 and 38 so that the wrapper web W does not contact the heated pressure bar until the web is bowed upwardly by engagement with the fixed shear bar 54. After being attached to the wrapper web W the individual rip strips 72 are advanced with the web along the before mentioned guide and slack take-up rolls to the wrapper sheet cutter blade 5. The blade 5 as is most clearly illustrated in Figs. 2 and 6 is carried by arms 76 secured to a rotatable cross shaft 77 driven in timed relationship with the other elements of the machine. The blade 5 is thus arranged to sever the web W into separate wrapping sheets while the rip strip attaching apparatus attaches a rip strip to the web so that there is a rip strip secured to each wrapper sheet. Adjustably secured to one of the arms 76 adjacent one end of the shaft 77 is a nicking cutter 78. The nicking cutter consists of a single or double piece of metal having spaced outer cutting edges 79 and 80 thereon with a notch or recess 81 therebetween. The nick cutter 78 is angularly advanced ahead of the rotating shear knife 5 and is adjusted longitudinally of the shaft 77 to overlie the edge of the wrapper web W. Thus the nicking cutter 78 may be made to nick or slot one edge of the web W in two positions one on each side of each rip strip 72 as is most clearly indicated at 82 in Fig. 8. Nicking the edge of the wrapper web and sheet facilitates opening of the finished wrapper or package with the rip strip particularly when the wrapper is of tough tear resistant material such as cellophane.

The nicking cutter 78 is shown mounted on the same arm which supports the knife 5 so that the particular embodiment illustrated is arranged to nick the web on each side of a rip strip applied closely adjacent to the edge of the wrapper sheet. However it is noted that if desired the nicking cutter could be made angularly adjustable with respect to the knife 5 to coact with a rip strip attached medially of a wrapper sheet severed by the knife 5.

Figures 9, 10:
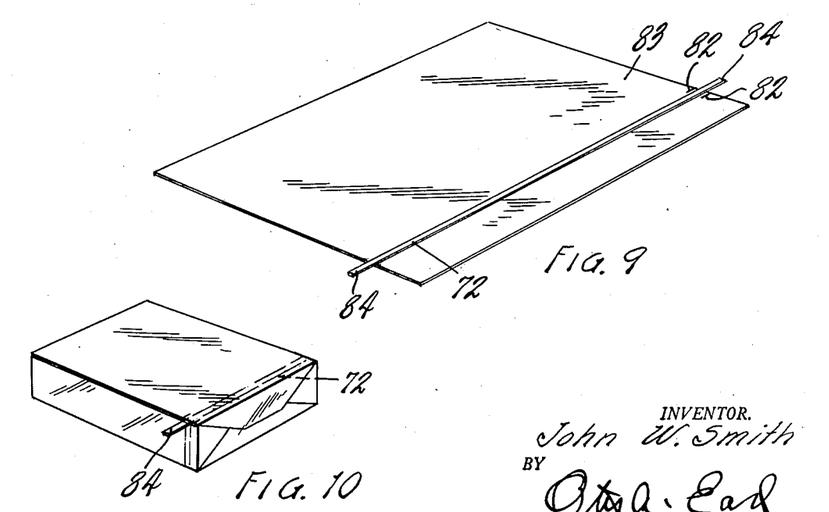
Fig. 9 is a perspective view of a wrapping sheet with the rip strip applied thereto as produced by my machine.
Fig. 10 is a perspective view of a package wrapped in a wrapper produced by my machine.

Figure 9 shows one form of wrapper sheet 83 with its tear strip 72 and edge nicks 82 as provided by my apparatus while Fig. 10 illustrates a package wrapped with the wrapper. The excess web width of rip strip material 9 over the web W of wrapping material results in the overhanging finger pieces 84 on the rip strip permitting it to be easily grasped to open the package.

The tear strip material may be provided with adhesive of the pressure sealing type in which case heat is not required. I have illustrated and described my invention in one practical embodiment thereof. I have not attempted to illustrate or describe other embodiments and adaptations as it is believed that this disclosure will enable those skilled in the art to adapt my invention as may be desired.

Having thus described my invention what I claim as new and desire to secure by Letters Patent is:

1. In combination with a wrapping machine having feed rolls adapted to continuously draw in a web of wrapping material and a knife for severing the web into individual sheets, spaced frame elements attached to said machine and supporting a supply roll of the wrapper web, a support connected to said elements and supporting a supply roll of strip forming material, said roll of strip material being longer than the roll of web material and parallel thereto, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife, fixed rolls extending between said frame elements adjacent to said table and adapted to deliver said web of strip material across said table to said fixed knife, guide rolls on said carriage disposed on the opposite side of said movable knife from said table and in parallel relationship on opposite sides of the plane of said fixed knife, other rolls extending between said frame elements and cooperative with said guide rolls to direct the web of wrapping material between said movable knife and said guide rolls, a heated pressure bar carried by said carriage and reciprocable therewith into engagement with said fixed knife, said pressure bar being mounted on said carriage for yielding motion in the direction of movement of the carriage and having its edge spaced from the plane of the wrapper web extending between said guide rolls and on the opposite side thereof from said fixed knife, means for reciprocating said carriage in equally timed relationship with the rotation of the knife on said wrapping machine, means for adjustably rotating said strip material feed rolls with each reciprocation of said carriage whereby a short length of strip material is advanced across said fixed knife and severed into a strip by said movable knife, grippers swingably mounted on said frame elements and engageable with the ends of each severed strip laterally from the edges of said web of wrapper material to hold each successive strip against said fixed knife until each strip is fused transversely across the surface of said wrapper web, means oscillating said grippers in timed relation with said carriage, slack takeup and payout mechanism engageable with said wrapper web between the rolls on said carriage and said wrapping machine and driven in timed relationship with said carriage whereby the web is stationary between said guide rolls during the time said pressure plate is engaged with the web, and a nicking cutter rotatable with said sheet cutting knife and angularly advanced with respect thereto to nick the edge of said wrapper web on each side of each transversely extending strip prior to severance of the sheet bearing the strip from the web of wrapper material.

2. In combination with a wrapping machine having feed rolls adapted to continuously draw in a web of wrapping material and a knife for severing the web into individual sheets, spaced frame elements attached to said machine and supoprting a supply roll of the wrapper web, a support connected to said elements and supporting a supply roll of strip forming material, said roll of strip material being longer than the roll of web material and parallel thereto, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife, fixed rolls extending between said frame elements adjacent to said table and adapted to deliver said web of strip material across said table to said fixed knife, guide rolls on said carriage disposed on the opposite side of said movable knife from said table and in parallel relationship on opposite sides of the plane of said fixed knife, other rolls extending between said frame elements and cooperative with said guide rolls to direct the web of wrapping material between said movable knife and said guide rolls, a heated pressure bar carried by said carriage and reciprocable therewith into engagement with said fixed knife, said pressure bar being mounted on said carriage for yielding motion in the direction of movement of the carriage and having its edge spaced from the plane of the wrapper web extending between said guide rolls and on the opposite side thereof from said fixed knife, means for reciprocating said carriage in timed relationship with the rotation of the knife on said wrapping machine, means for advancing said strip material feed rolls with each reciprocation of said carriage whereby a short length of strip material is advanced across said fixed knife and severed into a strip by said movable knife, grippers swingably mounted on said frame elements and engageable with the ends of each severed strip laterally from the edges of said web of wrapper material to hold each successive strip against said fixed knife until each strip is fused transversely across the surface of said wrapper web, means oscillating said grippers in timed relation with said carriage, slack takeup and payout mechanism engageable with said wrapper web between the rolls on said carriage and said wrapping machine and driven in timed relationship with said carriage whereby the web is stationary between said guide rolls during the time said pressure bar is engaged with the web, and a nicking cutter rotatable with said sheet cutting knife to nick the edge of said wrapper web on each side of each transversely extending strip.

3. In combination with a wrapping machine having rolls adapted to continuously draw in a web of wrapping material and a knife for severing the web into individual sheets, spaced frame elements attached to said machine, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife and translatable from a position near the edge of said fixed knife along the side of the fixed knife, rolls rotatably mounted in said frame elements and adapted to deliver a web of strip forming material across said table to said fixed knife, guide rolls on said carriage positioned on the opposite side of said movable knife from said table and on opposite sides of said fixed knife, other rolls extending between said frame elements and cooperative with said guide rolls to direct a web of wrapping material between said movable knife and said guide rolls, a heated pressure bar carried by said carriage and reciprocable therewith into engagement with said fixed knife, said pressure bar being mounted on said carriage for yielding motion in the direction of movement of the carriage and having its knife engaging edge spaced from the plane of the wrapper web extending between said guide rolls and on the opposite side of the wrapper web from said fixed knife, driving means connected to reciprocate said carriage in timed relationship with the operation of the knife on said wrapping machine, other driving means connected to advance said feed rolls intermittently in timed relationship with the operation of said carriage to advance a length of said strip forming web across said fixed knife, means engageable with said length of strip forming material to hold the same on said fixed knife, slack takeup and payout mechanism engageable with said wrapper web between the guide rolls on said carriage and said wrapping machine and driven in timed relationship with said carriage whereby the web is stationary between said guide rolls during the time said pressure bar is engaged with the web, and a nicking cutter driven in timed relationship with said knife on said wrapping machine and engageable with an edge of said wrapper web closely adjacent a strip secured to said web to nick the web.

4. In combination with a wrapping machine having rolls adapted to draw in a web of wrapping material and a knife for severing the web into individual sheets, spaced frame elements attached to said machine, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife and translatable from a position near the edge of said fixed knife along the side of the fixed knife, rolls rotatably mounted in said frame elements and adapted to deliver a web of strip forming material across said table to said fixed knife, guide rolls on said carriage positioned on the opposite side of said movable knife from said table and on opposite sides of said fixed knife, other rolls extending between said frame elements and cooperative with said guide rolls to direct said web of wrapping material between said movable knife and said guide rolls, a heated pressure bar carried by said carriage and reciprocable therewith into engagement with said fixed knife, said pressure bar having its knife engaging edge spaced from the plane of the wrapper web extending between said guide rolls and on the opposite side of the wrapper web from said fixed knife, driving means connected to reciprocate said carriage in timed relationship with the operation of the knife on said wrapping machine, other driving means connected to advance said feed rolls intermittently in timed relationship with the operation of said carriage to advance a length of said strip forming web across said fixed knife, means engageable with said length of strip forming material to hold the same on said fixed knife, and a nicking cutter driven in timed relationship with said knife on said wrapping machine and engageable with an edge of said wrapper web closely adjacent a strip secured to said web to nick the web.

5. In combination with a wrapping machine having rolls adapted to draw in a web of wrapping material and a knife for severing the web into individual sheets, spaced frame elements attached to said machine, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife and translatable from a position near the edge of said fixed knife along the side of the fixed knife, feed rolls rotatably mounted in said frame elements and adapted to deliver a web of strip forming material across said table to said fixed knife, guides on said carriage positioned on the opposite side of said movable knife from said table and on opposite sides of said fixed knife, other rolls extending between said frame elements and cooperative with said guides to direct said web of wrapping material between said movable knife and said guides, a heated pressure bar carried by said carriage and reciprocable therewith into engagement with said fixed knife, said pressure bar having its knife engaging edge spaced from the plane of the wrapper web extending between said guides and on the opposite side of the wrapper web from said fixed knife, driving means connected to reciprocate said carriage in timed relationship with the operation of the knife on said wrapping machine, other driving means connected to advance said feed rolls intermittently in timed relationship with the operation of said carriage to advance a length of said strip forming web across said fixed knife, means engageable with said length of strip forming material to hold the same on said fixed knife, and a nicking cutter driven in timed relationship with said knife on said wrapping machine and engageable with an edge of said wrapper web closely adjacent a strip secured to said web to nick the web.

6. In combination with a wrapping machine having rolls adapted to draw in a web of wrapping material and a knife for severing the web into individual sheets, spaced frame elements attached to said machine, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife and translatable from a position near the edge of said fixed knife along the side of the fixed knife, feed rolls rotatably mounted in said frame elements and adapted to deliver a web of strip forming material across said table to said fixed knife, guides on said carriage positioned on the opposite side of said movable knife from said table and on opposite sides of said fixed knife, other rolls extending between said frame elements and cooperative with said guides to direct said web of wrapping material between said movable knife and said guides, a pressure bar carried by said carriage and reciprocable therewith into engagement with said fixed knife, said pressure bar having its knife engaging edge spaced from the plane of the wrapper web extending between said guides and on the opposite side of the wrapper web from said fixed knife, driving means connected to reciprocate said carriage in timed relationship with the operation of the knife on said wrapping machine, other driving means connected to advance said feed rolls in timed relationship with the operation of said carriage to advance a length of said strip forming web across said fixed knife, and a nicking cutter driven in timed relationship with said knife on said wrapping machine and engageable with an edge of said wrapper web closely adjacent a strip secured to said web to nick the web.

7. In combination with a wrapping machine having rolls adapted to advance a web of wrapping material and a knife for severing the web into individual sheets, spaced frame elements on said machine, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife and translatable from a retracted position near the edge of said fixed knife along the side of the fixed knife, rolls rotatably mounted in said frame elements and adapted to deliver a web of strip forming material across said table to said fixed knife, guides on said carriage positioned on the opposite side of said movable knife from said table and on opposite sides of said fixed knife, other rolls extending between said frame elements and cooperative with said guides to direct said web of wrapping material between said movable knife and said guides, a heated pressure bar carried by said carriage and reciprocable therewith into engagement with said fixed knife, said pressure bar being mounted on said carriage for yielding motion in the direction of movement of the carriage and having its knife engaging edge spaced from the plane of the wrapper web extending between said guides and on the opposite side of the wrapper web from said fixed knife, driving means connected to reciprocate said carriage in timed relationship with the operation of the knife on said wrapping machine, other driving means connected to advance said feed rolls in timed relationship with the operation of said carriage to advance a length of said strip forming web across said fixed knife, and a nicking cutter driven in timed relationship with said sheet knife on said wrapping machine and engageable with an edge of said wrapper web closely adjacent a strip secured to said web to nick the web.

8. In combination with a wrapping machine having rolls adapted to advance a web of wrapping material and a knife for severing the web into individual sheets, spaced frame elements on said machine, a carriage reciprocably mounted on said frame elements and extending transversely therebetween, a fixed knife extending between said frame elements and alongside the path of said carriage, a movable knife carried by said carriage and cooperative with said fixed knife, a table on said carriage spaced from said movable knife and translatable from a retracted position near the edge of said fixed knife along the side of the fixed knife, rolls rotatably mounted in said frame elements and adapted to deliver a web of strip forming material across said table to said fixed knife, a guide on said carriage positioned on the opposite side of said movable knife from said table, other rolls extending between said frame elements and cooperative with said guide to direct said web of wrapping material between said movable knife and said guide, heated pressure bar carried by said carriage and reciprocable therewith into engagement with said fixed knife, said pressure bar having its knife engaging edge spaced from the plane of the wrapper web in the retracted position of said carriage and on the opposite side of the wrapper web from said fixed knife, driving means connected to reciprocate said carriage in timed relationship with the operation of the knife on said wrapping machine, and other driving means connected to advance said feed rolls in timed relationship with the operation of said carriage to advance a length of said strip forming web across said fixed knife.

9. Structure for applying rip strips transversely to a continuous web of wrapping material at spaced intervals along the web comprising, a frame, a carriage reciprocably mounted in said frame and extending transversely thereacross, rolls positioned to guide said web through said frame and said carriage, guide rolls carried by said carriage and engageable with said web to establish a reciprocable length of said web in said carriage, a pressure plate having a heated edge and yieldably mounted on said carriage with said edge extending transversely across the reciprocable length of said web and spaced therefrom, a movable knife carried by said carriage on the opposite side of said web from said plate, a fixed pressure plate carried by said frame and positioned to oppose the pressure plate on said carriage and grip the web therebetween, said fixed pressure plate having a cutting edge cooperative with said knife, a table carried by said carriage on the opposite side of the knife on the carriage from said guide rolls, said table being reciprocable with said carriage to approximately coplanar relation with the edge of said fixed pressure plate in the retracted position of said carriage, and means including intermittently driven feed rolls carried by said frame and adapted to advance a short length of a web of strip forming material across said table and said fixed knife with the edges of the web of strip forming material spaced transversely outwardly from the edges of the web of wrapper material.

10. Structure for applying rip strips transversely to a continuous web of wrapping material at spaced intervals along the web comprising, a frame, a carriage reciprocably mounted in said frame and extending transversely thereacross, rolls positioned to guide said web through said frame and said carriage, guide rolls carried by said carriage and engageable with said web to establish a reciprocable length of said web in said carriage, a pressure plate having a heated edge and yieldably mounted on said carriage with said edge extending transversely across the reciprocable length of said web and spaced therefrom, a movable knife carried by said carriage on the opposite side of said web from said plate, a fixed pressure plate carried by said frame and positioned to oppose the pressure plate on said carriage and grip the web therebetween, said fixed pressure plate having a cutting edge cooperative with said knife, a table carried by said carriage on the opposite side of the knife on the carriage from said guide rolls, said table being reciprocable with said carriage to approximately co-planar relation with the edge of said fixed pressure plate in the retracted position of said carriage, and means adapted to advance a short length of a web of strip forming material across said table and said fixed knife with the edges of the web of strip forming material spaced transversely outwardly from the edges of the web of wrapper material.

11. In a rip strip applying machine, means for advancing a length of wrapper web intermittently longitudinally of its length, a pressure plate extending transversely of said wrapper web and reciprocable normally with respect to one side thereof, guide elements positioned on each side of said pressure plate and reciprocable therewith to guide said web in spaced relationship across the edge of said pressure plate, a heater mounted on said pressure plate, a movable knife extending transversely of said web and spaced therefrom on the opposite side thereof from said pressure plate and reciprocable with said pressure plate, a fixed knife extending transversely of said web and having a flat edge opposed to said pressure plate to deflect said web between said guide elements against said pressure plate when said guide elements and pressure plate are advanced to said fixed knife, said movable knife having cutting engagement with an edge of said fixed knife, means for delivering a short length of a web of strip forming material between said knives and across the flat edge of said fixed knife, and means for holding said advanced length of strip forming material on said fixed knife until the strip forming material is bonded to said wrapper web between said pressure plate and said fixed knife.

12. In a rip strip applying machine, means for advancing a length of wrapper web longitudinally of its length, a pressure plate extending transversely of said wrapper web and reciprocable transversely with respect to the plane thereof, a guide element positioned to one side of said pressure plate and reciprocable therewith to guide said web in spaced relationship across the edge of said pressure plate in the retracted position of said guide and said pressure plate, a heater mounted on said pressure plate, a movable knife extending transversely of said web and spaced therefrom on the opposite side thereof from said pressure plate and reciprocable with said pressure plate, a fixed knife extending transversely of said web and having a flat edge opposed to said pressure plate to clamp said web against said pressure plate when said guide element and pressure plate are advanced to said fixed knife, said movable knife having cutting engagement with an edge of said fixed knife, and means for delivering a short length of a web of strip forming material between said knives and across the flat edge of said fixed knife.

13. In a rip strip applying machine, means for advancing a length of wrapper web longitudinally of its length, a pressure plate extending transversely of said wrapper web and reciprocable transversely with respect to the plane thereof, a guide element positioned to one side of said pressure plate and reciprocable therewith to guide said web in spaced relationship across the edge of said pressure plate in the retracted position of said guide and said pressure plate, a movable knife extending transversely of said web and on the opposite side thereof from said pressure plate and reciprocable with said pressure plate, a fixed knife extending transversely of said web and having a flat edge opposed to said pressure plate to clamp said web against said pressure plate when said guide element and pressure plate are advanced to said fixed knife, said movable knife having cutting engagement with an edge of said fixed knife, and means for delivering a short length of a web of strip forming material between said knives and across the flat edge of said fixed knife.

14. Laminating structure comprising, means for advancing a web longitudinally of its length, a pressure plate extending transversely of said web and reciprocable transversely with respect to the plane thereof, a guide element positioned to one side of said pressure plate and reciprocable therewith to guide said web in spaced relationship across the edge of said pressure plate in the retracted position of the guide and said pressure plate, a heater mounted on said pressure plate, a movable knife extending transversely of said web and on the opposite side thereof from said pressure plate and reciprocable with said pressure plate, a fixed knife extending transversely of said web and having a flat edge opposed to said pressure plate to clamp said web against said pressure plate when said pressure plate is advanced to said fixed knife, and means for delivering a second web between said knives and across the flat edge of said fixed knife.

15. Laminating structure comprising, means for advancing a web longitudinally of its length, a pressure plate extending transversely of said web and reciprocable transversely with respect to the plane thereof, a movable knife extending transversely of said web and on the opposite side thereof from said pressure plate and reciprocable with said pressure plate, a fixed knife extending transversely of said web and having a flat edge opposed to said pressure plate to clamp said web against said pressure plate when said pressure plate is advanced to said fixed knife, said movable knife having cutting engagement with an edge of said fixed knife, and means for delivering a second web between said knives and across the flat edge of said fixed knife.

16. Laminating structure comprising, means for advancing two webs of sheet material in overlapping spaced parallel relation, a pair of pressure members arranged transversely of the path of travel of said webs and on opposite sides thereof, means connected to said members to move said members relative to each other into clamping engagement on opposite sides of said webs, guide means spacing one of said webs from its adjacent pressure member in the open position of said pressure members, a heater associated with said one pressure member, and a knife extending between said webs and transversely of their path of travel ahead of said pressure members, said knife having a cutting edge operatively engageable with one of said webs and against one of said pressure members upon movement of said members to clamping position.

17. Laminating structure comprising, means for advancing two lengths of sheet material in overlapping spaced parallel relation, a pair of pressure members arranged transversely of the path of travel of said lengths and on opposite sides thereof, means connected to said members to move said members relative to each other into clamping engagement on opposite sides of said lengths, and a knife extending between said lengths and transversely of their path of travel ahead of said pressure members, said knife having a cutting edge operatively engageable with one of said lengths and against one of said pressure members upon movement of said members to clamping position.

18. The method of attaching rip strips to sheets of wrapping material which comprises the steps of, continuously advancing a web of wrapping material, intermittently advancing a web of strip forming material of greater width than said wrapper web and in parallel spaced relationship to the wrapper web with the edges of the strip forming web projecting transversely from the edges of the wrapper web, gripping the advanced edge of said strip forming web and severing a narrow length therefrom to form a rip strip, paying out slack from a portion of said web of wrapper material whereby another portion thereof remains stationary adjacent to said severed strip, advancing the stationary portion of the wrapper web laterally of its path of travel into engagement with said severed strip and applying heat and sealing pressure to the engaged materials, and thereafter severing said wrapper web into individual sheets each having a rip strip sealed thereto.

19. The method of attaching rip strips to sheets of wrapping material which comprises the steps of, continuously advancing a web of wrapping material, intermittently advancing a web of strip forming material of greater width than said wrapper web and in parallel spaced relationship to the wrapper web with the edges of the strip forming web projecting transversely from the edges of the wrapper web, gripping the advanced edge of said strip forming web and severing a narrow length therefrom to form a rip strip, paying out slack from a portion of said web of wrapper material whereby another portion thereof remains stationary adjacent to said severed strip, advancing the stationary portion of the wrapper web laterally of its path of travel into engagement with said severed strip and applying heat and sealing pressure to the engaged materials, and severing said wrapper web into individual sheets.

20. The method of attaching rip strips to wrapping material which comprises the steps of, advancing a web of wrapping material longitudinally, advancing a web of strip forming material at a much slower rate than the rate of advance of said wrapping material and in parallel overlapping spaced relation thereto, severing a short length from said web of strip forming material to form a rip strip by a transverse shearing motion substantially concurrent across said web of strip material, moving said web and the rip strip relatively transversely into engagement with each other, by a continuation of said shearing motion, and bonding the rip strip to the web by the application of heat.

21. The method of attaching rip strips to sheets of wrapping material which comprises the steps of, advancing a web of wrapping material longitudinally, intermittently advancing a web of strip forming material of greater width than said wrapper web and in longitudinally extending overlapping spaced relationship to the wrapper web with the one edge of the strip forming web projecting laterally from the edge of the wrapper web, severing a narrow length from the end of the strip forming web to form a rip strip, moving a transversely extending portion of said wrapper web laterally of its path of travel and against the severed strip of said strip forming material, applying sealing pressure and heat to said strip and said wrapper web, nicking an edge of said wrapper web adjacent to the wrapper strip secured thereto, and severing said wrapper web into individual sheets.

22. The method of attaching rip strips to sheets of wrapping material which comprises the steps of, advancing a sheet of wrapping material in a predetermined path, intermittently advancing a web of rip strip forming material in lapping spaced relationship to the wrapper sheet with the one edge of the strip forming web projecting laterally from the edge of the wrapper sheet, severing a narrow strip from the end of the strip forming web to form a rip strip, moving a transversely extending portion of said wrapper sheet laterally of its path of travel and against the severed rip strip of said strip forming material, and adhering said rip strip and said wrapper sheet.

23. The method of attaching rip strips to sheets of wrapping material which comprises the steps of, advancing a sheet of wrapping material in a predetermined path, advancing a web of strip forming material into overlapping spaced relationship to the wrapper sheet with one edge of the strip forming web projecting laterally from the edge of the wrapper sheet, severing a narrow strip from the end of the strip forming web to form a rip strip, moving a transversely extending portion of said wrapper sheet laterally of its path of travel and against the severed strip of said rip strip forming material, and adhering said rip strip to said wrapper sheet.

24. An apparatus for severing rip strips from a web of rip strip material and applying them to a web of wrapping material comprising means for supporting and translating a web of wrapping material, means for supporting and translating the rip strip material with the advancing end thereof in juxtaposed relation to a portion of the web of wrapping material, a cutter for cutting a rip strip from the juxtaposed end of the rip strip web transversely across the end thereof and supporting the severed rip strip simultaneously with the cutting thereof, a heated pressure bar disposed in opposed relation to said rip strip support to engage the opposite side of the wrapper web, and means for relatively reciprocating said pressure bar and rip strip support for pressing the wrapping web and the rip strip together and simultaneously applying heat thereto.

25. An apparatus for severing rip strips from a web of rip strip material and applying them to a web of wrapping material, comprising means for supporting and translating a web of wrapping material, means for supporting and translating a web of rip strip material with the advancing end thereof in juxtaposed relation to a portion of the web of wrapping material, a cutter for cutting a rip strip transversely across the juxtaposed end of the rip strip web, a support for the severed rip strip, a heated pressure bar disposed in opposed relation to said rip strip support to engage the side of the wrapper web opposite the rip strip, and means for relatively reciprocating said pressure bar and rip strip support for pressing the wrapping web and the rip strip together and simultaneously applying heat thereto.

References Cited in the file of this patent

UNITED STATES PATENTS

| Number | Name | Date |
|---|---|---|
| 195,209 | Dick | Sept. 18, 1877 |
| 1,004,150 | Cummings | Sept. 26, 1911 |
| 2,130,729 | Burns | Sept. 20, 1938 |
| 2,242,751 | McFarland | May 20, 1941 |
| 2,244,140 | Caldwell | June 3, 1941 |
| 2,265,609 | Milmoe | Dec. 9, 1941 |
| 2,268,474 | Chalmers | Dec. 30, 1941 |
| 2,276,745 | Smith | Mar. 17, 1942 |
| 2,279,724 | Von Hofe | Apr. 14, 1942 |
| 2,326,436 | Caldwell | Aug. 10, 1943 |
| 2,333,750 | Tompkins | Nov. 9, 1943 |
| 2,334,030 | Banney et al. | Nov. 9, 1943 |
| 2,378,112 | Tuthill | June 12, 1945 |
| 2,527,272 | Lyon et al. | Oct. 24, 1950 |
| 2,600,322 | Raney | June 16, 1952 |